(12) United States Patent
Prieur et al.

(10) Patent No.: US 9,484,125 B2
(45) Date of Patent: Nov. 1, 2016

(54) MICA-BASED STRIP

(75) Inventors: Benoit Prieur, Brussels (BE); Francisco Del Rey, Louvain-la-Neuve (BE)

(73) Assignee: COGEBI S.A., Lot (BE)

(*) Notice: Subject to any disclaimer, the term of this patent is extended or adjusted under 35 U.S.C. 154(b) by 205 days.

(21) Appl. No.: 13/884,790

(22) PCT Filed: Nov. 10, 2010

(86) PCT No.: PCT/EP2010/067247
§ 371 (c)(1),
(2), (4) Date: Sep. 6, 2013

(87) PCT Pub. No.: WO2012/062363
PCT Pub. Date: May 18, 2012

(65) Prior Publication Data
US 2013/0341068 A1   Dec. 26, 2013

(51) Int. Cl.
| H01B 7/00 | (2006.01) |
| H01B 7/02 | (2006.01) |
| B32B 19/04 | (2006.01) |
| B32B 27/20 | (2006.01) |
| H01B 3/04 | (2006.01) |
| H01B 3/00 | (2006.01) |
| H01B 17/60 | (2006.01) |

(52) U.S. Cl.
CPC .......... *H01B 7/0241* (2013.01); *B32B 19/045* (2013.01); *B32B 27/20* (2013.01); *H01B 3/006* (2013.01); *H01B 3/04* (2013.01); *H01B 17/60* (2013.01); *B32B 2457/00* (2013.01); *B32B 2553/00* (2013.01); *Y10T 428/24999* (2015.04); *Y10T 428/3154* (2015.04); *Y10T 428/31663* (2015.04); *Y10T 428/31667* (2015.04)

(58) Field of Classification Search
CPC ................................. H01B 3/04; H01B 3/10
USPC ......................... 174/120 R, 137 B
See application file for complete search history.

(56) References Cited

U.S. PATENT DOCUMENTS

| 4,001,128 A * | 1/1977 | Penneck ................. 524/263 |
| 4,286,010 A | 8/1981 | Staley et al. |
| 4,704,322 A | 11/1987 | Roberts |
| 6,017,627 A * | 1/2000 | Iwata et al. ............. 428/375 |
| 7,577,329 B2 * | 8/2009 | Mumm ................... 385/100 |
| 2002/0041060 A1 | 4/2002 | Liang |
| 2004/0180991 A1 * | 9/2004 | Che et al. ............... 523/223 |

(Continued)

FOREIGN PATENT DOCUMENTS

| EP | 0790623 A1 | 8/1997 |
| JP | 52-132045 A | 11/1977 |

(Continued)

OTHER PUBLICATIONS

International Searching Authority/European Patent Office (ISA/EP). International Search Report, PCT Application No. PCT/EP2010/067247. Jun. 7, 2011.

(Continued)

*Primary Examiner* — Chau N Nguyen
(74) *Attorney, Agent, or Firm* — The Marbury Law Group, PLLC

(57) ABSTRACT

The present invention relates to a multilayer strip (1) comprising at least: an essentially mica-based layer (3) and a polymeric layer (2) comprising 60 to 85% by weight of a mineral filler (4) and 15 to 40% by weight of a polymer.

14 Claims, 3 Drawing Sheets

(56) References Cited

U.S. PATENT DOCUMENTS

| | | | |
|---|---|---|---|
| 2004/0226740 A1 | 11/2004 | Tsunoda et al. | |
| 2005/0208301 A1* | 9/2005 | Okamoto et al. | 428/402 |
| 2006/0182947 A1* | 8/2006 | Jerri | B29C 70/025 428/316.6 |
| 2008/0050580 A1* | 2/2008 | Stevens et al. | 428/327 |

FOREIGN PATENT DOCUMENTS

| | | |
|---|---|---|
| JP | 60-253105 S | 12/1985 |
| JP | 11-113204 A | 4/1999 |
| WO | 2005/123825 A2 | 12/2005 |
| WO | 2009/147417 A1 | 12/2009 |

OTHER PUBLICATIONS

International Searching Authority/European Patent Office (ISA/EP). Written Opinion of the International Searching Authority, PCT Application No. PCT/EP2010/067247. Jun. 7, 2011.

Vogelmann, M. "Glimmer als Hochleistungsisolierstoff der Elektrotechnik." Technische Rundschau, Hallwag AG, CH, vol. 82, No. 45, pp. 54-55,57. Nov. 9, 1990.

Engelhardt, K. "The use of corona resistant polyimide films in HV rotating machines." IBM Technical Disclosure Bulletin, International Business Machines Corp. (Thornwood), US, vol. 40, No. 8, pp. 17-19. Aug. 1, 1997.

* cited by examiner

MICA-BASED STRIP

RELATED APPLICATIONS

This application is the U.S. national phase entry under 35 U.S.C. §371 of PCT Application No. PCT/EP2010/067247, filed Nov. 10, 2010. Application PCT/EP2010/067247 is incorporated herein by reference in its entirety.

FIELD OF THE INVENTION

The present invention relates to a multi-layer strip comprising at least one mica layer, to the use thereof as electric insulating layer and to an electric cable comprising said strip.

STATE OF THE ART

The particularly desired characteristics of sheaths for high-performance electric cables are lightweight and small diameter, good resistance to piercing, to arc tracking and to abrasion as well as good heat stability, low flammability, insensitivity to water and usual solvents, and smooth outer surface contour.

Mica-based strips have often been used to insulate wires or electric cables optionally in combination with one or more polymer layers. Mica paper is effectively known for its excellent thermal and dielectric properties which impart good fire resistance to the end product containing mica paper and allows high insulating values to be obtained. Mica paper also has high chemical stability against a broad range of chemical products including those promoting hydrolysis.

At industrial level, strips made of mica paper are manufactured from mica paper prepared in the manner described hereafter. The mica is placed in suspension in pulp form in water, then transformed into mica paper by filtering and drying using machines similar to conventional paper machines; the product obtained, called mica paper, at this stage comprises 100% mica and is in the form of sheets of grammage between 25 and 360 g/m$^2$. The sheets can then be wound continuously and be in the form of spools. Before winding, the mica paper can advantageously be impregnated with at least one resin preferably organic or silicone. The impregnated mica paper may optionally be laminated onto a substrate which can be of any type and in particular may be in the form of a glass fibre fabric or in the form of a polymer sheet or film. The mica product thus laminated may optionally be wound.

Document U.S. Pat. No. 4,286,010 teaches the combination of mica paper with a glass scrim reinforcement bonded with an elastomer impregnant, a polybutadiene, applied in the form of a solution in toluene. This impregnant is applied both to the mica paper and to the glass scrim. The two layers are then placed in contact and the impregnating solution impregnates the mica paper and the glass scrim simultaneously allowing the bonding of the two layers. The product obtained is in the form of mica sheet or tape and therefore comprises a layer of polybutadiene inserted between the mica paper layer and the glass scrim.

Document U.S. Pat. No. 4,704,322 also teaches the use of an epoxidized impregnating material for glass scrim, associated with a sheet of mica paper. The impregnating solution is applied to all the layers formed by the mica paper and the glass scrim during or after the placing in contact of the two layers. The structure is therefore in the form of a product having an epoxy resin on the surface of the mica paper and forming a bond with the scrim. It is also to be noted that since glass scrims have an open structure, the impregnant is easily able to migrate towards the outer surface of the glass scrim substrate. On this account, the free surface of the mica paper may be contaminated by the impregnant e.g. during spooling of the product obtained or when taping the tape around a cable. This may also lead to adhesion of the mica tape onto the conductor intended to form the cable to be insulated, and subsequently may be the cause of defects when stripping cables.

Document WO2009/147417 describes a wire or conductive cable comprising two insulating layers of PEEK optionally encapsulating a mica layer. PEEK is the thermoplastic polymer having the highest known temperature resistance during continuous use and has the best fire resistance among the class of technical polymers. Nevertheless, it is of high cots, difficult to apply and requires highly specialised equipment. In addition, the mechanical properties of this material are scarcely adapted for this type of application (cable taping).

It is also known to disperse mica flakes in a polymer, typically by using an intermediate step to place them in suspension or solution. Japanese document JP-60/253 105 A2 describes metal wires (described as resistant to dielectric breakdown and resistant to piercing) formed by applying onto a conductor a 28 μm layer of a mixture comprising an aromatic polyimide and 1 to 33% mica particles. Mica is present as a filler, in particular in the form of dispersed particles and used to reinforce the polymer.

AIMS OF THE INVENTION

The present invention aims to provide a mica strip intended for taping electric cables which does not have the disadvantages of prior art insulating tapes.

In particular, the present invention aims to propose a mica-based insulating product having high fire resistance.

The present invention also aims to propose a solution with which it is possible to replace the use of substrates currently used such as glass silk or scrim by a lower cost material that is easy to manufacture but having equivalent or better flame performance than that of the materials currently used as substrate.

Finally, the present invention aims to prevent the risks of adherence between the successive turns of the taped product forming the cable, a problem that is often encountered with the currently used tapes or substrates.

Other advantages will become apparent in the description of the invention.

SUMMARY OF THE INVENTION

The present invention concerns a multilayer strip (1) comprising at least:
- an essentially mica-based layer (3);
- a polymer layer 2 comprising 60 to 85% by weight of a mineral filler (4) and 15 to 40% by weight of a polymer.

By <<essentially mica-based layer>> is meant a mica layer optionally comprising small amounts of impurities and optionally associated with an impregnating resin.

By impregnating resin is meant a resin added by capillarity to the mica paper after the forming thereof.

According to preferred embodiments of the invention, the multilayer strip comprises at least one or any suitable combination of the following characteristics:
   said polymer is selected from the group consisting of polyolefin, polyester (in particular PET and its copolymers); polyamide (in particular PA6, PA6.6, PA11, PA12, ... ) and halogenated polyolefins (in particular PVC, PVDF and PTFE);

the polymer is a polyolefin selected from the group consisting of polyethylene, polypropylene, copolymer of propylene and copolymers of ethylene and an alpha-olefin comprising 3 to 8 carbons;

the polyolefin is a polyethylene or a mixture of polyethylenes of different densities;

the polymer comprises (consists of) HDPE;

the essentially mica-based layer is a layer of mica paper, optionally impregnated with a resin;

the impregnating resin of the mica layer is silicone-based;

the essentially mica-based layer (3) is laminated to the polymeric layer (2) by means of an adhesive, said adhesive preferably being an adhesive of silicone type;

the mineral filler is selected from the group consisting of calcium carbonate, calcium sulphate, barium sulphate, aluminium silicate (hydrated such as kaolinite for example), alumina, aluminium hydroxide (ATH), magnesium, zinc oxide, mica, chalk, talc, titanium dioxide, silica, clay (such as bentonite or montmorillonite), kieselguhr (diatoms) or dolomite and mixtures thereof;

the mineral filler is selected from the group consisting of calcium carbonate, diatomite (kieselguhr) and/or silica and mixtures thereof;

the polymeric layer has a porosity (5) comprised between 40 and 75% by volume, preferably between 50 and 60% by volume;

the porosity of the polymeric layer (2) is of closed type;

the polymeric layer (2) further comprises a coupling agent allowing the coupling of the mineral filler with the polyolefin;

the coupling agent is a silane, preferably a beta-(3,4-epoxycyclohexyl)ethyl trimethoxy-silane.

A second aspect of the invention concerns an electric cable comprising a conductive core, an intermediate sheath formed by taping a multilayer strip according to the invention described in the foregoing and an insulating polymeric outer sheath.

A third aspect of the invention concerns the use of the multilayer strip according to the invention for taping an electric conductor.

KEY TO THE FIGURES

Figure 1:
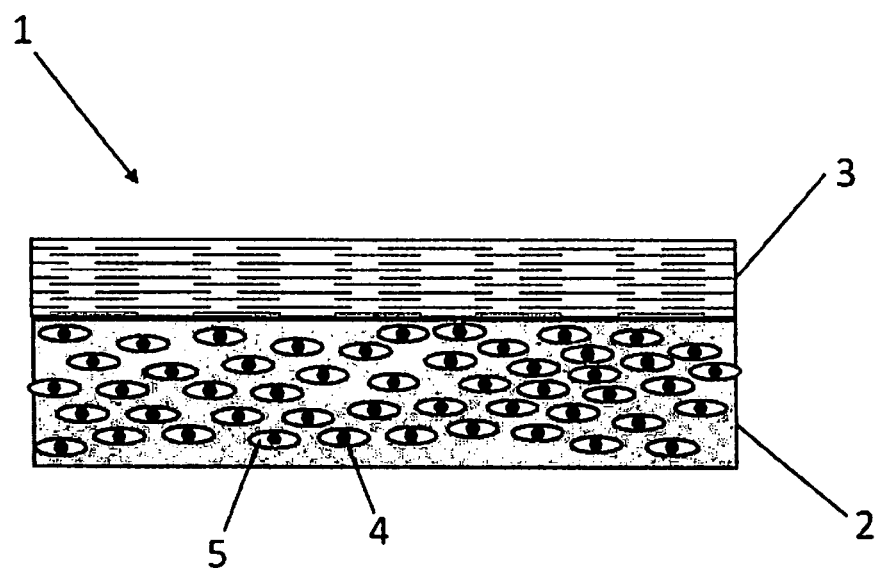
FIG. 1 schematically illustrates a cross-section of an example of mica strip according to the invention.
Figure 2:
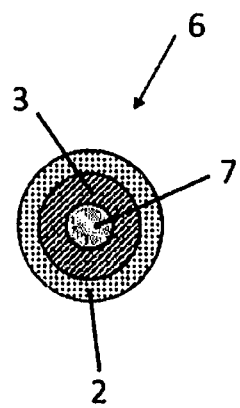
FIG. 2 schematically illustrates a cross-section of a cable insulated using a mica strip of the invention.
Figure 3:
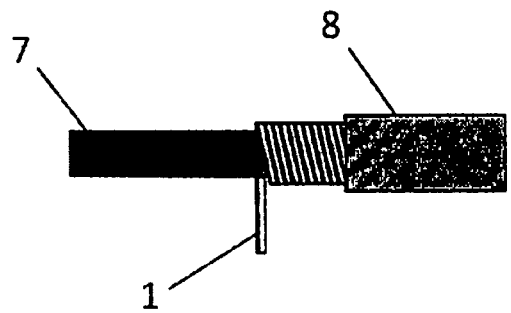
FIG. 3 is a side view of a cable around which mica strip of the invention is wound, the insulated cable comprising an additional coating layer.

1. Multilayer mica strip
2. Polymeric substrate layer
3. Mica paper
4. Mineral filler
5. Cavity (closed porosity)
6. Cable insulated with a mica strip
7. Conductor
8. Additional insulating layer (insulating sheath)
9. Assembly layer

DETAILED DESCRIPTION OF THE INVENTION

The present invention concerns an insulating multilayer strip 1 chiefly used to insulate electric cables. These strips are generally helically wound around these electric conductors to ensure the insulation thereof.

The strip of the invention comprises an essentially mica-based layer, preferably in mica paper, whose fire resistance is particularly high. Mica paper is used for its electric insulating properties and heat resistance.

Preferably, the essentially mica-based layer is mica paper. By mica paper is meant a sheet of mica obtained by filtering an aqueous solution of exfoliated mica, the filtrate then being dried. This mica paper is preferably impregnated with a resin improving its mechanical properties and optionally its water resistance.

Preferably, the resin impregnation represents between 5 and 30% by weight of the layer of impregnated mica paper. Preferably, the impregnating resin represents 9 to 22% by weight of the impregnated paper.

It is noted that the preferred mica paper obtained by filtration and subsequent impregnation with a resin differs from the mica sheets obtained by dispersing mica in a polymeric resin in that the mica in the impregnated mica paper forms a continuous phase, allowing good mechanical strength to be maintained even over and above the softening or degradation temperature of the impregnating resin.

Preferably, the mica paper of the invention has a grammage (weight per surface unit) of between 20 and 400 g/m². More advantageously, between 75 and 360 g/m².

In the present invention, the mica paper is mechanically joined to a polymeric layer 2. This layer may be bonded using an adhesive or any other means known to those skilled in the art (e.g. extrusion coating).

This polymeric layer comprises a high content of inert mineral filler. This filler represents at least 60% by weight of this layer, preferably at least 70% by weight and advantageously about 80% by weight of the polymeric layer. This filler particularly provides sufficient mechanical strength in the polymeric layer by preventing the formation and detachment of drops during the melting of the polymer matrix up until complete carbonisation of this layer. The filler also allows reducing the migration of conductive degradation products across the mica paper, which allows improving the dielectric fire resistance properties of the strip obtained.

By polymer layer or polymeric layer is meant a layer with a polymer matrix optionally comprising usual additives. This layer may also be described as a mineral layer comprising a polymeric binder, the binder forming a continuous phase.

For easy application of this polymeric layer 2, preferably the filler does not exceed 85% by weight of the polymer layer. Ideally, this mineral filler does not exceed 80% by weight of the polymer layer.

The used mineral filler is preferably selected from the group consisting of calcium carbonate, calcium sulphate, barium sulphate, aluminium silicate (hydrated such as kaolinite for example), alumina, aluminium hydroxide (ATH), magnesium, zinc oxide, mica, chalk, talc, titanium dioxide, silica, clay (such as bentonite or montmorillonite), kieselguhr (diatoms) or dolomite and mixtures thereof. Preferably, the mineral filler comprises calcium carbonate, diatoms (kieselguhr) and/or silica.

The mineral filler is finely divided and is in the form of particles 4 of size typically less than 50 µm, preferably less than 10 µm, advantageously less than 2 µm.

Alternatively, the mineral filler may comprise mineral fibres such as glass fibres or basalt fibres. These fibres are preferably in the form of short fibres and present a low interface adhesion so that they do not cause too much rigidifying of the strip (low stress transfer at the interface).

To reduce the density of the strip 1 and to improve its mechanical properties, the polymer layer 2 preferably has high porosity in the form of numerous cavities 5. This porosity is characterized by the ratio between the bulk density of the polymer layer and its theoretical density.

The improvement in mechanical properties chiefly consists in achieving a yield point elongation ($\in\gamma$) of the polymer layer 2 that is as low as possible, compatible with the subsequent taping operation. Preferably, this yield point deformation is lower than the elongation at fracture of the mica paper 3. Indeed, if the yield point elongation of the polymeric substrate 2 is too high, this substrate could mask continuity defects in the underlying mica 3 when winding the strip around a cable 7 to be insulated. This masking of defects could lead to a risk of major defects in the cables insulated with the strip of the invention.

To adjust this elongation at fracture, it is possible to optimise both the porosity and the concentration of mineral filler. One advantage of the use of a porous polymeric layer is that a reduction in elongation at fracture is obtained without reducing the flexibility of the polymeric film.

This porosity also allows a reduction in the density of the carbon layer resulting from extended exposure to a flame, and hence reduces the heat conductivity of the insulator.

The porosity is preferably porosity of closed type, thereby allowing the preserving of the barrier properties of the continuous polymer layer. This barrier particularly allows preventing the migration of liquid or gas towards the mica layer. These diffusing liquids or gases may lead to a reduction in the breakdown resistance of the mica layer 3.

This type of closed porosity may be obtained for example by elongation of the polymer layer 2 during the solidification thereof. Indeed, the difference in mechanical properties between the mineral filler and the polymeric matrix then causes detaching of the interface and the onset of cavities or voids 5 in the structure. This type of structure is obtained for example by extrusion-blow of a filled polymer such as described in document US 2002/0041060 incorporated herein as reference.

Alternatively, the closed porosity can be obtained by adding a foaming agent which generates a gas during the production process of the polymeric layer. This type of agent may be azodicarbonamide for example or any other foaming agent known to those skilled in the art.

Preferably, the used polymer layer comprises a polyolefin or a polyolefin mixture, such as polypropylene or polyethylene. Preferably, the polymer of said polymeric layer essentially consists of polyethylene. The polymer advantageously comprises high density polyethylene (HDPE). Preferably, the polymer layer of the invention comprises a mixture of polyethylenes of different structures (HDPE, MDPE, LDPE, LLDPE . . . ).

In addition to the usual additives (neutralisers, antioxidants . . . ) it is advantageously possible to add coupling agents such as silane coupling agents, in particular beta-(3, 4,epoxycyclohexyl)ethyltrimethoxysilane (sold under the trade name <<Silquest A186 Silane>> by Crompton).

Advantageously the polyethylene of the polymer layer is cross-linked to improve its fire resistance properties.

Alternatively, the polymeric matrix comprises (or essentially consists of) any type of usual polymer such as polyesters, polyamides, halogenated, chlorinated or fluorinated polyolefins (PVC, PVDC, PVDF, PTFE . . . ) or mixtures of these polymers.

Preferably, the used polymers may be cross-linked using any method known to skilled persons to improve the heat resistance thereof.

The thickness of the polymeric layer is preferably comprised between 25 and 200 µm, more advantageously between 50 and 150 µm.

Another aspect of the invention concerns an electric cable 6 insulated by a strip 1 of the invention, wherein the strip 1 is helically wound around a conductive core 7 of the cable, the turns of the winding being contiguous and optionally being overlapped to ensure continuity of the insulator.

Figure 4:
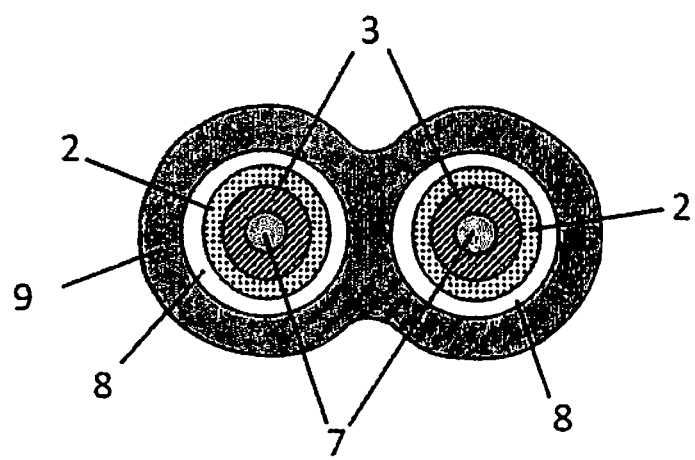
FIG. 4 shows a cable comprising two conductors whose insulation is reinforced by a mica strip according to the invention.

The insulated cables thus obtained are generally coated with an additional insulator 8 at a subsequent step. This coating step is generally performed by concentric extrusion around the insulated cable. During this coating step, the cables may optionally be grouped into bundles of several conductors such as illustrated in FIG. 4 (single-phase, three-phase, optionally neutral and earth, or command or transmission cables of multipolar data).

EXAMPLE

A polyethylene substrate marketed by Taiwan Lung Meng Technology Co. Ltd. under the trade name RP Rich Mineral Paper was used. This product is marketed in Europe under the name Eco-Sprint. This substrate has a weight concentration of 80% mineral filler and 20% polyethylene. The melting point of this polyethylene, measured by DSC, is about 128.6° C. This substrate has a thickness of 100 µm and a bulk density of 1.2. This density corresponds to a porosity of a little more than 50% of the total volume of the layer.

Figure 6:
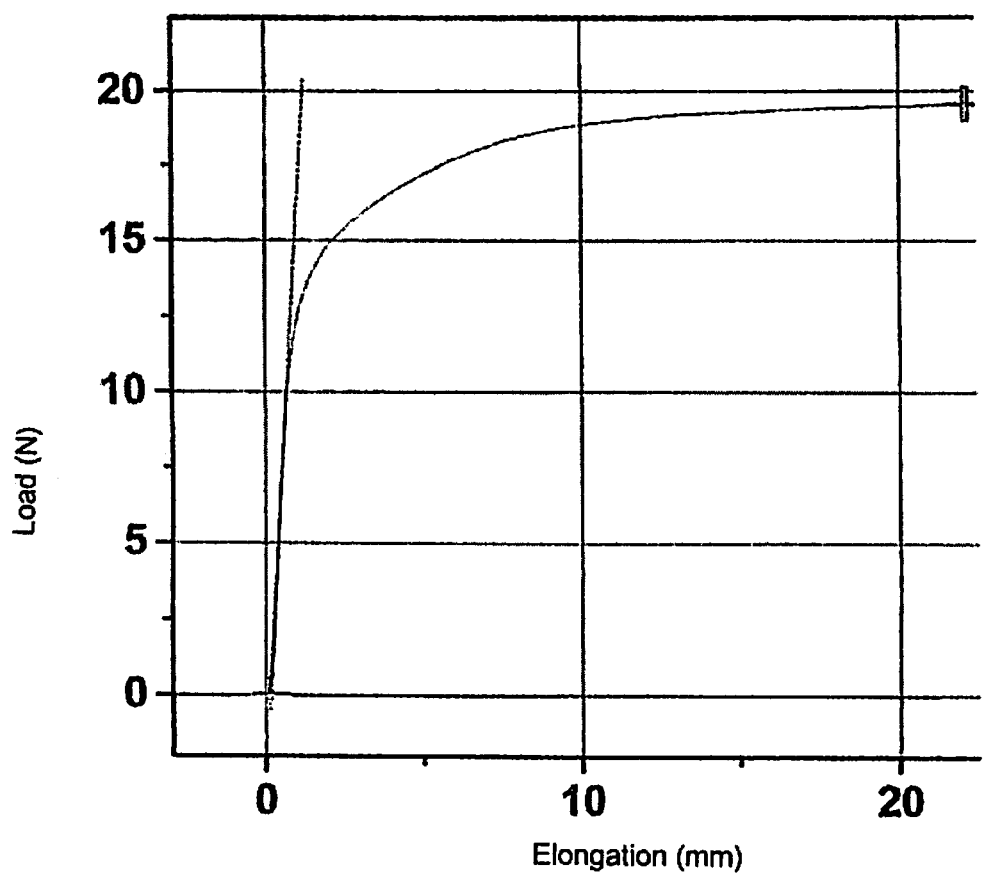
FIG. 6 shows the deformation curve, as a function of the applied load of a polymeric substrate used in the Examples (Ecoprint™ 100).

FIG. 6 illustrates the deformation curve of this Eco-sprint substrate as a function of the filler. This test was conducted at ambient temperature. The thickness of the tested film was 124 µm for a width of 15 mm and length between the jaws of the traction machine of 100 mm.

This substrate was laminated onto Phlogopite mica paper of 82 g/m² impregnated with a silicone adhesive (polydimethyl siloxane adhesive supplied by Dow Corning) with a bonding content of 11.4 g/m². The total weight of the construction is 237.5 g/m².

The obtained strips were used to tape two conductors, to test the insulation thereof under fire exposure conditions. The strips were wound in two successive passes, each pass providing a 20% overlap between two successive turns.

The results of the flame exposure tests according to standard BS6387 cat. C, are given in FIG. 5. The sample in the Example carries reference number F80-INOR-100. It is compared in this Figure with a sample named Firox 80P34A. This is a strip, having the same thickness of phlogopite mica paper, laminated on glass silk as substrate (prior art).

Figure 5:
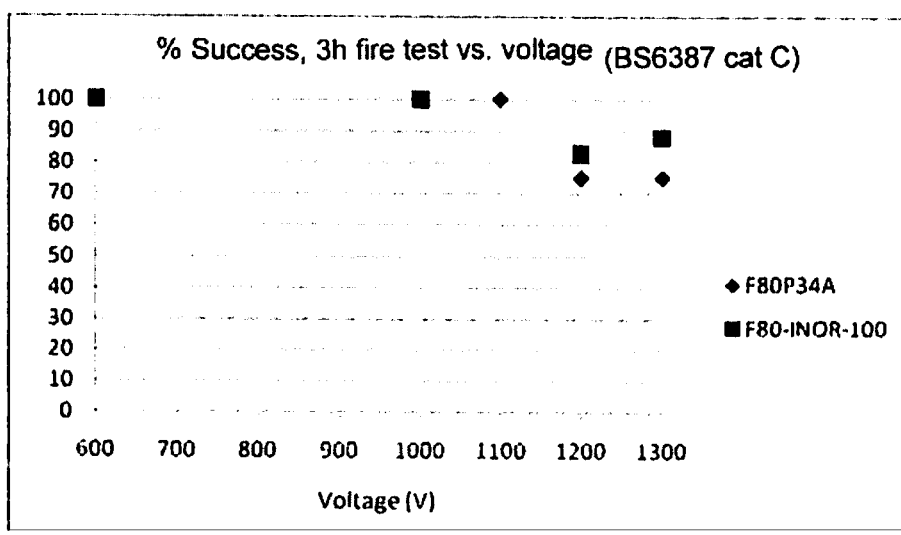
FIG. 5 gives the comparative results of exposure to flame using the BS6387 cat. C flame test.

FIG. 5 gives the test success percentages (3 h15) as a function of voltages between conductors for the strip of the Example (F 80-INOR-100) compared with the reference sample (Firox 80P34A). These results represent the ratio of the number of breakdowns per number of samples following exposure to a flame for 3 h. Surprisingly, it was observed that the strip performance was improved by substituting the glass silk substrate by the substrate of the Example.

Indeed, it is commonly acknowledged that substrates of organic film type (e.g. PE, PET, etc.) used as substrate to manufacture mica strip for cables strongly reduce the electrical insulation properties of the product when it is exposed to a flame, compared with strips whose substrate is a glass silk fabric. This reduction in performance level is generally interpreted as a result of the migration of conductive combustion products within the mica paper.

In addition, the high price of glass fabrics is a factor which may limit the use in some strips applications using this fabric as substrate. Also, the open nature of these glass fabrics does not offer much insulation for the mica paper against vapours originating from the sheath of the conductor. These vapours may condense in the interstices of the mica paper which, for some types of sheaths, may reduce the survival time of the cable exposed to a flame.

The closed nature of the polymeric substrate of the invention also allows the encapsulation of the products used during the preparation of the strip at the interface between the two layers, in particular adhesives. This barrier, for example, may prevent the mica from adhering too strongly onto the conductor, which will facilitate stripping of the conductor and prevent possible poor contact caused by mica residues.

Comparative tests were also conducted to verify the impact of the polymer strip alone. In this experiment, the mica layer was eliminated. In this case, the tested cables do not maintain their insulation even at voltages lower than 600V. The mineral layer left by the substrate after combustion cannot therefore alone account for the improvement in strip properties compared with the strip having a glass fabric substrate (Firox 80P34A).

The invention claimed is:

1. Multilayer strip comprising:
    an essentially mica-based layer; and
    an extruded polymeric layer comprising 60 to 85% by weight of a mineral filler and 15 to 40% by weight of a polymer,
    the mineral filler being selected from the group consisting of calcium carbonate, calcium sulphate, barium sulphate, aluminium silicate, hydrated aluminium silicate, alumina, aluminium hydroxide (ATH), magnesium, zinc oxide, mica, chalk, talc, titanium dioxide, silica, clay, kieselguhr, diatoms, dolomite and mixtures thereof, and
    the polymeric layer having a closed porosity between 40 and 75 percent by volume.

2. The multilayer strip according to claim 1, wherein said polymer is selected from the group consisting of polyolefin, polyester, polyamide and halogenated polyolefins.

3. The multilayer strip according to claim 2, wherein the polymer is a polyolefin selected from the group consisting of polyethylene, polypropylene, copolymer of propylene and copolymers of ethylene and at least one alpha-olefin comprising 3 to 8 carbons.

4. The multilayer strip according to claim 3, wherein the polyolefin is as polyethylene or a mixture of polyethylenes of different densities.

5. The multilayer strip according to claim 4, wherein the polyethylene comprises a HDPE.

6. The multilayer strip according to claim 1, wherein the essentially mica-based layer is a layer of mica paper impregnated with a resin.

7. The multilayer strip according to claim 6, wherein the impregnating resin of the essentially mica-based layer is silicone-based.

8. The multilayer strip according to claim 1, wherein the essentially mica-based layer is laminated to the polymeric layer by an adhesive.

9. The multilayer strip according to claim 1, wherein the polymeric layer further comprises a coupling agent allowing the coupling of the mineral filler with the polymer.

10. The multilayer strip according to claim 9, wherein the coupling agent is a silane.

11. The multilayer strip according to claim 9, wherein the coupling agent is a beta-(3,4-epoxycyclohexyl)ethyl trimethoxy-silane.

12. An electric conductor isolated by means of the multilayer strip according to claim 1, said multilayer strip being spirally winded around said electric conductor.

13. The multilayer strip according to claim 1, wherein the essentially mica-based layer is laminated to the polymeric layer by an adhesive of silicone type.

14. The multilayer strip according to claim 1, wherein the polymeric layer has a porosity comprised between 50 and 60% by volume.

* * * * *